(12) United States Patent
Feigel

(10) Patent No.: US 6,213,568 B1
(45) Date of Patent: Apr. 10, 2001

(54) HYDRAULIC BRAKING SYSTEM OPERATED BY EXTRANEOUS FORCE

(75) Inventor: Hans-Jörg Feigel, Rosbach (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/180,817

(22) PCT Filed: Mar. 13, 1998

(86) PCT No.: PCT/EP98/01482

§ 371 Date: May 7, 1999

§ 102(e) Date: May 7, 1999

(87) PCT Pub. No.: WO98/41430

PCT Pub. Date: Sep. 24, 1998

(30) Foreign Application Priority Data

Mar. 15, 1997 (DE) .............................................. 197 10 862

(51) Int. Cl.[7] ...................................................... B60T 8/36
(52) U.S. Cl. ................................... 303/114.1; 303/113.4; 303/119.2
(58) Field of Search ............................. 303/113.1, 113.2, 303/113.4, 114.1, 119.1, 119.2; 137/596.17

(56) References Cited

U.S. PATENT DOCUMENTS

| | | | |
|---|---|---|---|
| 3,880,476 | * | 4/1975 | Belart et al. ........................ 303/119.2 |
| 5,018,797 | * | 5/1991 | Takata ................................ 303/119.2 |
| 5,109,886 | * | 5/1992 | Takata et al. ...................... 303/119.2 |
| 5,127,435 | * | 7/1992 | Takata et al. ...................... 137/596.17 |
| 5,234,030 | * | 8/1993 | Kervagoret et al. ............. 137/596.17 |
| 5,492,394 | * | 2/1996 | Kusano et al. .................... 303/113.2 |
| 5,531,509 | * | 7/1996 | Kellner et al. .................... 303/114.1 |

FOREIGN PATENT DOCUMENTS

| | | |
|---|---|---|
| 19 41 098 | 2/1971 | (DE) . |
| 22 62 247 | 6/1974 | (DE) . |
| 32 41 662 | 5/1984 | (DE) . |
| 36 26 292 | 2/1988 | (DE) . |
| 40 34 839 | 3/1992 | (DE) . |
| 44 43 373 | 6/1995 | (DE) . |
| 44 30 168 | 2/1996 | (DE) . |
| 195 18 333 | 11/1996 | (DE) . |
| 0 441 543 | 8/1991 | (EP) . |
| 0 524 032 | 1/1993 | (EP) . |
| 0 607 451 | 7/1994 | (EP) . |
| 2 267 543 | 12/1993 | (GB) . |

OTHER PUBLICATIONS

Patents Abstracts of Japan No. 61196852, published Sep. 1, 1986.

* cited by examiner

*Primary Examiner*—Christopher P. Schwartz
(74) *Attorney, Agent, or Firm*—Rader, Fishman & Grauer PLLC

(57) ABSTRACT

The present invention relates to a hydraulic brake system for automotive vehicles operable by independent force which includes a master brake cylinder preceded by a hydraulic brake force booster that has a booster piston and a working chamber to which an auxiliary pressure source is connectable, wherein a valve device operable by way of an electromagnetic drive is provided which establishes a hydraulic connection between the working chamber and an unpressurized pressure fluid supply reservoir in a first switching position and a connection between the working chamber and the auxiliary pressure source in a second switching position. To ensure low-noise operation of the brake system and a sensitively controlled volume delivery of the pressure fluid, the valve device is provided with a slide valve (20) of analog operation.

20 Claims, 2 Drawing Sheets

HYDRAULIC BRAKING SYSTEM OPERATED BY EXTRANEOUS FORCE

BACKGROUND OF THE INVENTION

The present invention relates to a hydraulic brake system for automotive vehicles operable by independent force which includes a master brake cylinder preceded by a hydraulic brake force booster that has a booster piston and a working chamber to which an auxiliary pressure source is connectable, wherein a valve device operable by way of an electromagnetic drive is provided which establishes a hydraulic connection between the working chamber and an unpressurized pressure fluid supply reservoir in a first switching position and a connection between the working chamber and the auxiliary pressure source in a second switching position.

A brake system of this type is disclosed in German patent No. 32 41 662, for example. Preferably, the valve device of the prior art brake system comprises one normally open and one normally closed electromagnetic valve which are configured as digitally operated valves which are actuated by maximum openings of different length (pulse width modulation) and, thus, are less appropriate for controlling or dosing the hydraulic pressure introduced into the working chamber.

SUMMARY OF THE INVENTION

Therefore, an object of the present invention is to improve upon a hydraulic brake system operable by independent force of the type mentioned hereinabove to such effect that a comfortable response behavior is ensured and the noises occurring during operation are reduced simultaneously.

Another objective is that the valve device have very small dimensions, and permit quick initial braking, on the one hand, and a sensitively controlled volume delivery in the normal braking mode, on the other hand.

According to the present invention, this object is achieved because the valve device is configured as a slide valve of analog operation.

To render the idea of the present invention more specific, the slide valve is configured as a slide guided in a sleeve-shaped housing member and having two control edges, the first control edge along with a corresponding control edge on the housing member providing a first variable throttle cross-section which controls the hydraulic connection between the working chamber and the unpressurized pressure fluid supply reservoir, and the second control edge along with a second control edge on the housing member provides a second variable throttle cross-section which controls the hydraulic connection between the working chamber and the auxiliary pressure source.

In a preferred aspect of the present invention, the slide has a hollow design and includes a bore which permits a connection between a port associated with the auxiliary pressure source and a port associated with the working chamber. According to the present invention, this achieves a pressure compensation on both sides of the slide so that the electromagnetic drive may be correspondingly reduced in dimensions. The present invention also provides the possibility of using one type of multi-way valve for different vehicle classes.

Advantageously, a slot-type seal is produced between the port associated with the auxiliary pressure source and the port associated with the pressure fluid supply reservoir. The slot-type seal is formed by the radial clearance between the slide and the housing member. To increase the reliability in operation of the mentioned seal, a sealed contact joint, preferably configured as a biassed elastomeric, especially teflon seal, is arranged in series with the slot-type seal.

According to a preferred aspect of the present invention, the separating effect of the second throttle cross-section is increased because the second control edge on the slide, in conjunction with a stop designed as a sealing seat, forms a seat valve which is serially connected with the second throttle cross-section.

The stop which preferably determines the first switching position or the initial position of the slide may be configured as a conical or spherical seat, for example, or by an elastomeric ring element, for example, an O-ring.

In order to control disturbing friction forces in another preferred aspect of the subject matter of the present invention, a means is provided which permits sensing the slide position and having its output signals adapted to be supplied to an electronic controller which influences the electromagnetic drive. It is especially appropriate when the electromagnetic drive is configured as a proportional magnet.

The reliability in operation of the brake system of the present invention is enhanced in a particularly favorable manner in that a non-return valve which closes towards the pressure fluid supply reservoir is inserted into the valve device in the connection between the working chamber and the pressure fluid supply reservoir. Besides, it is expedient when the second control edge after lifting from the sealing seat still overlaps the second control edge of the housing member and will not open the second throttle cross-section until the second control edge has passed.

Further features, advantages and details of the present invention can be seen in the attached patent claims and the illustration and subsequent description of a preferred embodiment of the brake system of the present invention. In the accompanying drawings,

DETAILED DESCRIPTION OF THE DRAWINGS

Figure 1:
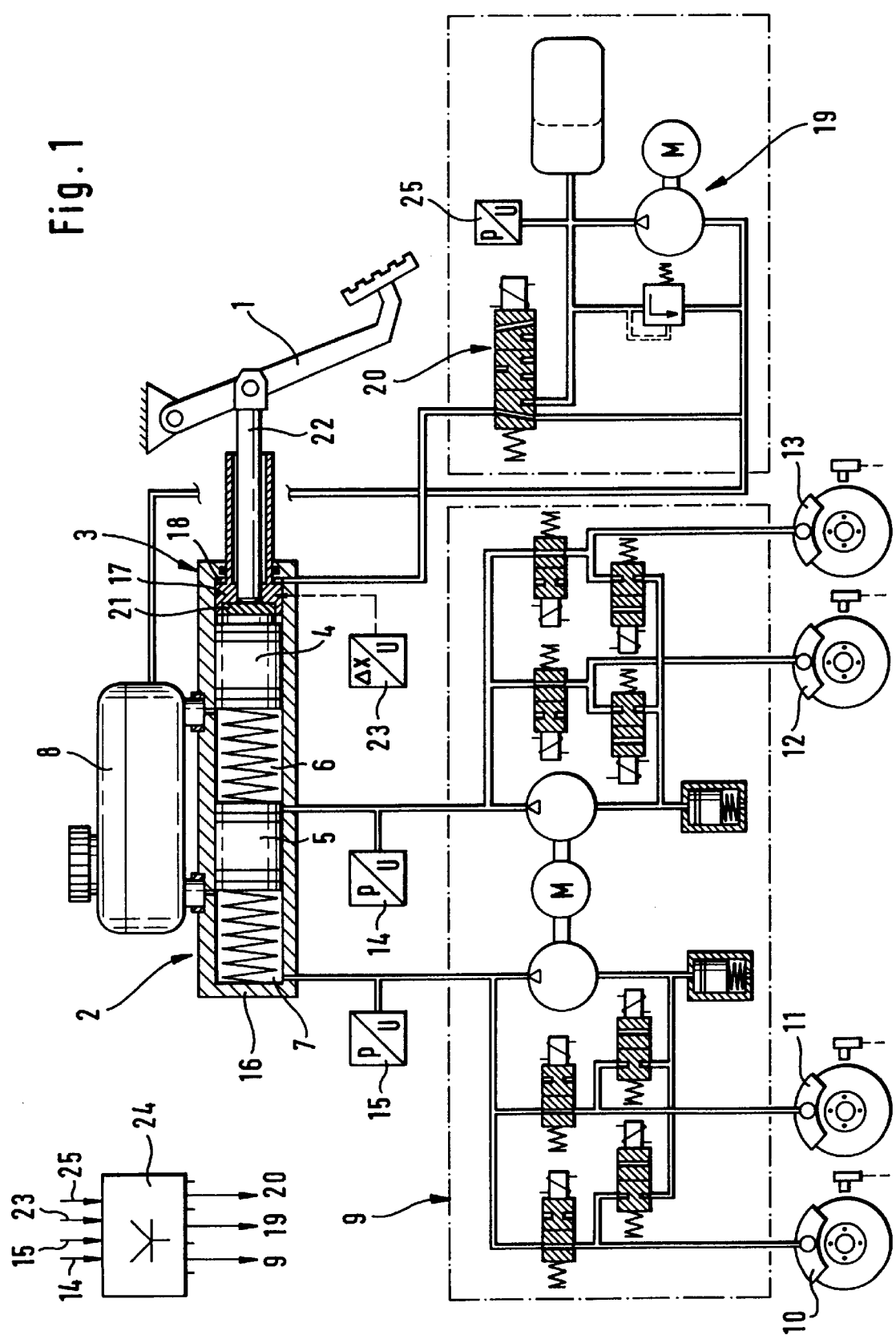
FIG. 1 is a circuit diagram of the brake system of the present invention.

The hydraulic brake system of the present invention shown in the FIG. 1 embodiment includes a pressure generator, preferably a tandem master brake cylinder 2, operable by an actuating pedal 1. The pressure generator is preceded by a hydraulic brake force booster 3 in terms of effect. The tandem master cylinder 2 has pressure chambers 6, 7 which are separated from each other by two pistons 4, 5 and are connected to an unpressurized pressure fluid supply reservoir 8. Connected to the pressure chambers 6, 7, preferably by the intermediary of an only represented ABS modulator 9, are wheel brakes 10, 11, 12 and 13 associated with the vehicle wheels, and pressure sensors 14, 15.

The above-mentioned hydraulic brake force booster 3 is generally composed of a working chamber 18 which is defined by a booster piston 17 in the housing 16 of the master brake cylinder 3. Chamber 18 is adapted to be connected to a hydraulic auxiliary pressure source 19 and the pressure fluid supply reservoir 8. The connection between the working chamber 18 and the auxiliary pressure source 19 and the pressure fluid supply reservoir 8 is preferably effected by way of an electromagnetically operable three-way/three-position directional control valve 20. The force is transmitted from the booster piston 17 to the first master cylinder piston 4 by way of a rubber-elastic reaction plate 21 which simultaneously permits transmitting the actuating force which is generated by the vehicle driver and introduced at the actuating pedal 1. Preferably, a push rod 22 which is coupled to the actuating pedal 1 and guided in the booster piston 18 is used to transmit the actuating force. Further, an electronic sensor device 23 is provided which senses the movement of the booster piston 17 and whose signals are furnished to an electronic control unit 24, represented only schematically. Control unit 24 influences the pressure modulation in an ABS control operation and actuates the auxiliary pressure source 19. The output signals of the above-mentioned pressure sensors 14, 15 and a third pressure sensor 25 sensing the pressure generated by the auxiliary pressure source 19 are also sent to the control unit 24.

Figure 2:
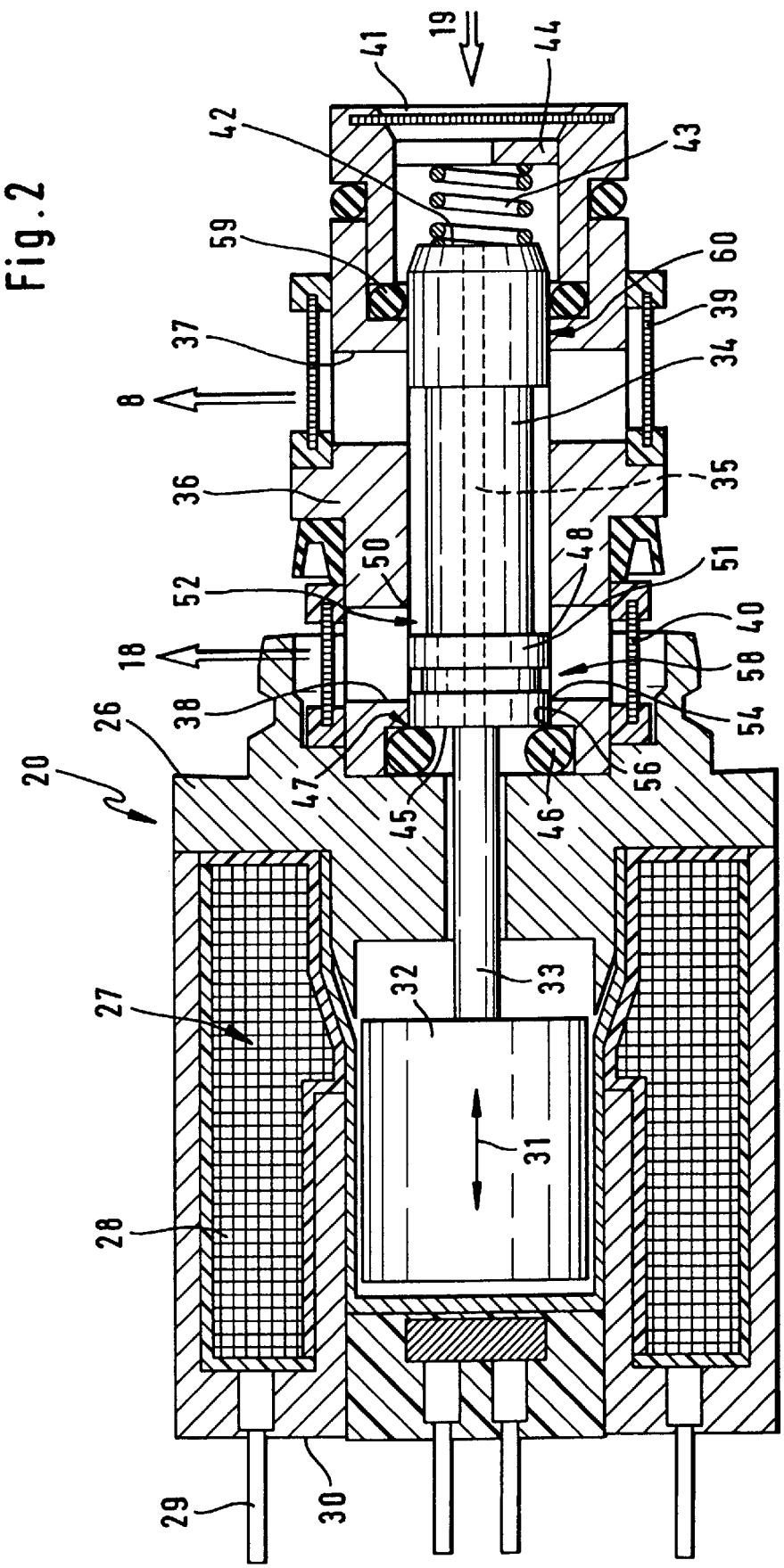
FIG. 2 is an axial cross-sectional view of a valve device used in the brake system of FIG. 1.

The design of the above-mentioned three-way/two-position directional control valve 20 can be seen from FIG. 2 in particular. Reference numeral 26 designates a housing block which accommodates an electromagnetic drive 27. The electromagnetic drive 27 comprises a coil 28 having its connections 29 extend outwardly on one frontal end 30 of the housing block 26, as well as an armature 32 which is slidable in a longitudinal direction 31 of the valve. Extending from the armature 32 in the direction opposite the frontal end 30 of the housing block 26 is a tappet rod 33 which is rigidly connected to a slide 34. Slide 34 has a through-opening 35 which extends in the longitudinal direction 31.

On the side of the housing block 26 opposite to the longitudinal direction 31 of the frontal end 30, a sleeve-shaped housing member 36 is pressure-tightly joined which accommodates the slide 34 in sliding relationship in a longitudinal direction 31. The sleeve-shaped housing member 36 has two radially extending openings 37, 38 which are spaced from each other in a longitudinal direction 31. A filter 39 or 40 is arranged in openings 37, 38, respectively. The radial opening 37 forms a port for the above-mentioned pressure-fluid supply reservoir 8. Opening 38 provides a port which is in connection with the working chamber 18 of the hydraulic booster 3. On the side of the sleeve-shaped housing member 36 remote from the housing block 26, the longitudinal opening 35 terminates into a port 41 to which the pressure side of the auxiliary pressure source 19 is connected.

The sleeve-shaped housing member 36 is sealingly received in another housing block (not shown).

On the frontal end 42 of the slide 34 which is remote from the tappet 33 and close to the port 41 for the auxiliary pressure source 19, a spring 43 is supported with one end on a radially inwardly projecting step 44 and with the other end on the frontal end 42 of the slide 34, biasing the latter slide in the longitudinal direction 31 towards the electromagnetic drive 27.

The slide 34 forms a seat valve 47 with its frontal end 45 close to the electromagnetic drive 27 and with an elastomeric ring element 46 which bears against the housing block 26 so as to form a sealing seat.

A first radial collar 51 which is provided on the slide 34 forms a first control edge 48 which, in conjunction with a corresponding control edge 50 of the sleeve-shaped housing member 36, forms a first variable throttle cross-section 52 between the port 38 to the working chamber 18 and the radial opening 37 to the pressure fluid supply reservoir 8.

The slide 34 is configured as a hollow slide so that through its opening 35 a pressure and flow communication is established between the portion adjacent to the frontal end 42 of the slide 34 on the auxiliary pressure source side and the portion adjacent to the armature-side frontal end 45 of the slide 34. The frontal end 45 of the slide 34 forms a second control edge 54 which, in conjunction with a corresponding control edge 56 of the housing member 36, produces a second variable throttle cross-section 58 between the auxiliary pressure source 19 and the working chamber 18 which is variable by displacement of the slide 34 and can be opened or closed.

FIG. 2 shows the valve device 20 in its initial position. In the nonexcited condition of the electromagnetic drive 27, the slide 34 is subjected to the preload of the spring 43 in its first end position where the throttle cross-section 52 between working chamber 18 and pressure fluid supply reservoir 8 is maximally opened. The control edge 54 towards the working chamber 18 has overridden the control edge 56 so that the working chamber 18 is separated from the auxiliary pressure source 19 in terms of flow. To provide a reliable sealing or separation, the seat valve 47 is also closed, that means, the control edge 54 of the slide 34 is urged by the spring 43 to sealingly bear against the elastomeric ring element 46.

As soon as a request of the driver for deceleration is detected by the brake controlling and regulating device 24, the electromagnetic drive 27 will be energized and the armature is moved to the right to adopt its second end position in opposition to the effect of spring 43 in a longitudinal direction 31. The slide 34 is moved in the same direction, and the seat valve 47 is opened by the control edge 54 of the slide 34 being lifted from the elastomeric ring element 46 and the control edge 54 brushing over the control edge 56 so that a progressively increasing throttling cross-section 58 between the auxiliary pressure source and the working chamber 18 is opened. Thus, pressure build-up occurs in the working chamber 18 of the hydraulic brake force booster 3.

To introduce pressure decrease, it is necessary that the spring 43 reset the slide 34 until the throttle cross-section 52 is opened and the connection between the working chamber 18 and the pressure fluid supply reservoir 8 is opened. However, before the throttle cross-section 52 is opened, the control edge 45 of the slide 34 overrides the corresponding control edge 56 so that the auxiliary pressure source 19 is severed. Only thereafter will the throttle cross-section 52 towards the pressure fluid supply reservoir 8 open.

Further, a phase in which the pressure is maintained constant can be controlled by the valve device 20 of the present invention. This phase is achieved in a particularly preferred manner by a combination of pulse-width modulation and pulse amplitude modulation of the control signals for the electromagnetic drive 27. To this end, the armature 32 and, thus, the tappet 33 and slide 34 are returned with respect to the above-described position of pressure increase (not shown) so far in the direction of the initial position that the control edge 54 of the slide 34 which is associated with the auxiliary pressure source 19 just about reaches the corresponding control edge 56 or only very slightly overlaps it. In this slide position, the control edge 48 of the slide 34 close to the working chamber is also in the area of its corresponding control edge 50. By slightest movement of the slide 34 in the one or the other direction as a result of a corresponding actuation of the electromagnetic drive 27, the pressure in the working chamber 18 can be further reduced or re-increased. Thus, a sensitively controlled volume delivery is provided without having to put up with disturbing stop noises of the armature in pulse width modulation due to differently long maximum openings of the valve.

A slot-type seal is produced between the peripheral surface of the end of the slide 34 close to the auxiliary pressure source 19 and the housing member 22. The slot-type seal, which is produced and defined by the radial clearance between the slide 34 and the housing member 36, separates the auxiliary pressure source port 41 from the reservoir port 37. In addition, a sealed contact joint 59 in the shape of another elastomeric ring element is provided in an axial direction in the mentioned area of the multi-way valve 20 shown. Seal 59 seals the slot between the slide 34 and the sleeve-shaped housing member 36.

What is claimed is:

1. A hydraulic brake system for automotive vehicles operable by independent force which includes a master brake cylinder preceded by a hydraulic brake force booster that has a booster piston and a working chamber to which an auxiliary pressure source is connectable, wherein a valve operable by way of an electromagnetic drive is provided which establishes a hydraulic connection between the working chamber and an unpressurized pressure fluid supply reservoir in a first switching position and a connection between the working chamber and the auxiliary pressure source in a second switching position, the valve being configured as a slide valve of analog operation.

2. A hydraulic brake system as claimed in claim 1, wherein the slide valve is configured as a slide guided in a sleeve-shaped housing member having two control edges, the first control edge along with a corresponding control edge on the housing member providing a first variable throttle cross-section which controls the hydraulic connection between the working chamber and the unpressurized pressure fluid supply reservoir, and the second control edge along with a second control edge on the housing member provides a second variable throttle cross-section which controls the hydraulic connection between the working chamber and the auxiliary pressure source.

3. A hydraulic brake system as claimed in claim 2, wherein the second control edge on the slide, in conjunction with a stop designed as a sealing seat, forms a seat valve which is serially connected with the second throttle cross-section.

4. A hydraulic brake system as claimed in claim 3, wherein the stop determines the first switching position of the slide.

5. A hydraulic brake system as claimed in claim 3, wherein the stop is configured as a conical or spherical seat.

6. A hydraulic brake system as claimed in claim 3, wherein the stop is configured as an elastomeric ring element.

7. A hydraulic brake system as claimed in claim 3, wherein the second control edge after lifting from the sealing seat still overlaps the second control edge of the housing member and will not open the second throttle cross-section until the second control edge has passed.

8. A hydraulic brake system as claimed in claim 2, wherein the slide has a hollow design and includes a bore which permits a connection between a port associated with the auxiliary pressure source and a port associated with the working chamber.

9. A hydraulic brake system as claimed in claim 8, wherein both ends of the slide are acted upon by the pressure which is generated by the auxiliary pressure source.

10. A hydraulic brake system as claimed in claim 2, wherein the slide is biassed in the direction of the first switching position.

11. A hydraulic brake system as claimed in claim 2, wherein the hydraulic connection between the working chamber and the auxiliary pressrue source is closed in the first switching position of the slide.

12. A hydraulic brake system as claimed in claim 2, wherein the first throttle cross-section has its largest opening in the first switching position of the slide.

13. A hydraulic brake system as claimed in claim 1, wherein a slot-type seal is produced between the port associated with the auxiliary pressure source and the port associated with the pressure fluid supply reservoir.

14. A hydraulic brake system as claimed in claim 13, wherein a seated contact joint is connected in series with the slot-type seal.

15. A hydraulic brake system as claimed in claim 14, wherein the sealed contact joint is configured as a biassed elastomeric seal, in particular a teflon seal.

16. A hydraulic brake system as claimed in claim 13, wherein the slot-type seal is produced by a radial clearance between the slide and the housing member.

17. A hydraulic brake system as claimed in claim 1, wherein a means is provided which permits sensing the slide position and having its output signals adapted to be supplied to an electronic controller which influences the electromagnetic drive.

18. A hydraulic brake system as claimed in claim 1, wherein the electromagnetic drive is configured as a proportional magnet.

19. A hydraulic brake system as claimed in claim 1, wherein a non-return valve which closes towards the pressure fluid supply reservoir is inserted into the valve device in the connection between the working chamber and the pressure fluid supply reservoir.

20. A hydraulic brake system as claimed in claim 1, wherein the port which is associated with the auxiliary pressure source is provided on the side of the housing member remote from the drive.

* * * * *

UNITED STATES PATENT AND TRADEMARK OFFICE
CERTIFICATE OF CORRECTION

PATENT NO.   : 6,213,568 B1
DATED        : April 10, 2001
INVENTOR(S)  : Hans-Jorg Feigel It is certified that error appears in the above-identified patent and that said Letters Patent is hereby corrected as shown below:

<u>Column 6,</u>
Line 17, change "pressrue source" to -- pressure source --.

Signed and Sealed this

Twenty-eighth Day of May, 2002

Attest:

Attesting Officer

JAMES E. ROGAN
*Director of the United States Patent and Trademark Office*